(No Model.)
J. O. DAVIS.
PUMP PISTON.
No. 272,662. Patented Feb. 20, 1883.
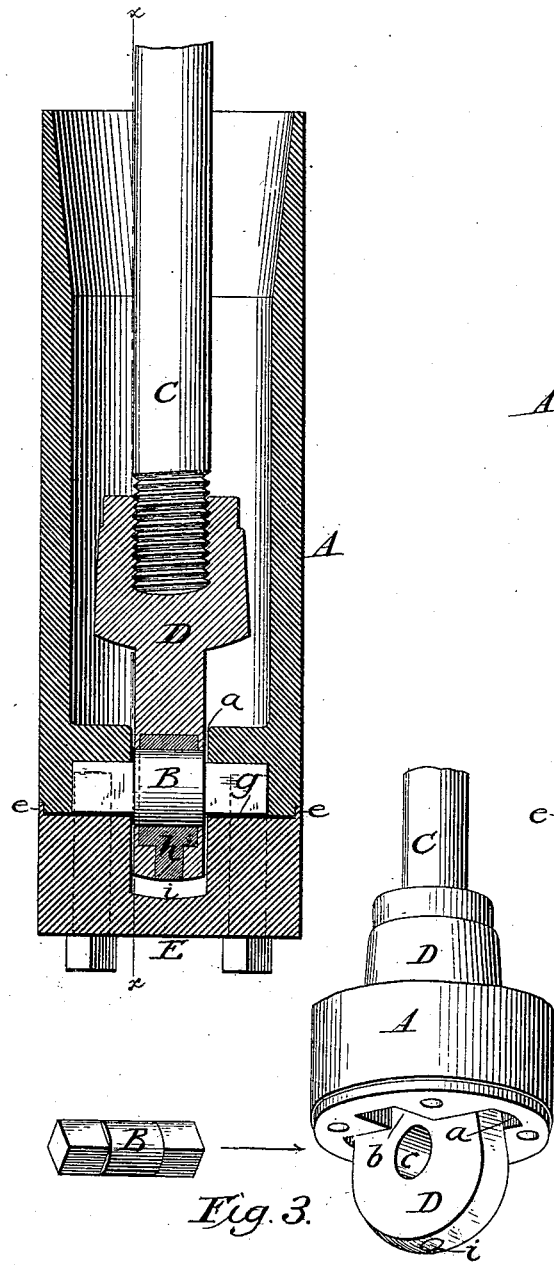
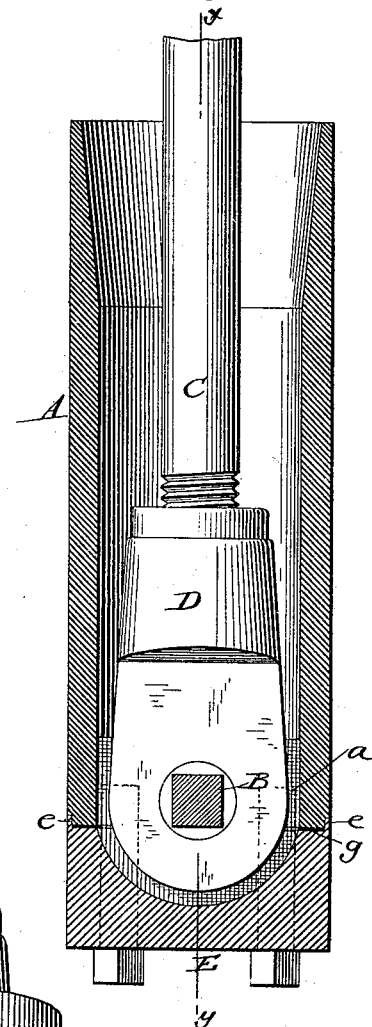
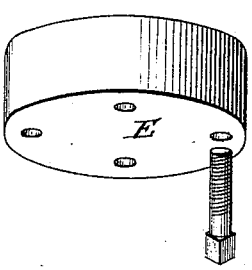
Attest.
Sidney P. Hollingsworth
Wm. H. Shipley
Inventor.
Jno. O. Davis
By his Attorney,
Philip T. Dodge

UNITED STATES PATENT OFFICE.

JOHN O. DAVIS, OF HARTFORD, CONNECTICUT.

PUMP-PISTON.

SPECIFICATION forming part of Letters Patent No. 272,662, dated February 20, 1883.

Application filed November 27, 1882. (No model.)

*To all whom it may concern:*

Be it known that I, JOHN O. DAVIS, of Hartford, in the county of Hartford and State of Connecticut, have invented certain Improvements in Pump-Pistons, of which the following is a specification.

My invention relates to an improved manner of constructing pump-plungers, more particularly those known as "bucket-plungers," and of attaching the same to the actuating rod or pitman.

In consists in constructing the plunger with a removable end or cap, arranged to lower and hold in place a pivot wrist-pin seated in an external recess in the body of the plunger and extending through the end of the rod.

It also consists in minor details, hereinafter explained.

Figures 1 and 2 represent longitudinal central sections of my plunger, taken the first in line with the axis of the connecting-pivot and the other at right angles thereto. Fig. 3 is a perspective view, showing the parts separated, and indicating the manner in which they are assembled.

A represents the body of the plunger, made of cylindrical form and tubular, except at the lower end, where it is closed, with the exception of a transverse central slot, $a$, which receives the end of the operating-rod. At its lower end the body is provided, on opposite sides of the slot, with two external angular recesses, $b$, to receive the ends of the pivot or wrist pin. This pin B is made of suitable length to extend across the slot $a$ and fill the recesses $b$, its central portion being cylindrical in form, while its ends are adapted to fit snugly within the recesses.

C represents the actuating-rod, commonly denominated the "piston-rod," "plunger-rod," and "pitman," the upper end of which will be connected, as usual, with a crank or other actuating device. At its lower end the rod has a head, D, which is rounded at the end, flattened on the two sides to enter the slot $a$, and provided with the central opening, $c$, to admit the pivot-pin. As shown in Fig. 3, the flat portion of the head is of such length that it may be thrust downward through the slot and beyond the end of the plunger a sufficient distance to permit the insertion of the pivot-pin B into the hole $c$. After the insertion of the pin the head D is drawn backward, and the ends of the pin thereby seated in the body. To secure the pin in place and close the lower end of the plunger, I employ a cap-plate, E, bolted firmly to and forming a continuation of the body, as shown. This plate rests upon and holds the ends of the pivot-pin, but is recessed at the center to avoid friction on the head. Around its outer edge the cap has a raised flange, $e$, which is seated over and around a corresponding shoulder formed on the end of the body, the parts being thus held in line and a tight joint produced between them. As an additional precaution against leakage, a sheet, $g$, of oiled paper, rubber, or other packing may be inserted between the body and cap. For the purpose of insuring an accurate fit and avoiding friction, I provide the head D with a lining of Babbitt metal or other anti-friction material, $h$. This is seated in a groove in the inside of the head, and is inserted by pouring it in a molten condition through a hole, $i$, provided in the head for the purpose. By introducing the metal when the head and pin are in place in the body an accurate alignment of the bearing is secured, and all danger of the parts binding or heating avoided.

While it is preferred to provide the wrist-pin with angular ends to prevent its rotation, it is obvious that its ends may be made of round form, in which case the recesses will have a corresponding shape.

Having thus described my invention, what I claim is—

1. In combination with the plunger-body and its removable cap, the actuating-rod and the pivot-pin seated between the cap and body.

2. In combination with the body A, having the transverse slot and the external recesses in its lower end, the pivot-pin having the round center and angular ends, the connecting-rod, and the cap plate secured to the body.

3. In combination with a plunger-body, a connecting-rod extending through the same from one side, and a pivot-pin applied and secured upon the opposite side, substantially as shown.

4. The combination of the body, actuating-rod, pivot-pin, and cap, with the packing seated between the body and cap.

5. In combination with the actuating-rod and pivot-pin, the body and the cap, united by the flange and fastening-bolts, substantially as shown.

6. In combination with the plunger and pivot-pin, the actuating-rod provided with the anti-friction lining, in the manner described and shown.

JOHN O. DAVIS.

Witnesses:
H. P. REDFIELD,
A. H. NEWTON.